United States Patent [19]
Amemiya

[11] Patent Number: 5,619,343
[45] Date of Patent: Apr. 8, 1997

[54] IMAGE READING APPARATUS FOR READING BOTH SIDES OF A DOUBLE-SIDED ORIGINAL

[75] Inventor: Masami Amemiya, Tokyo, Japan

[73] Assignee: Canon Kabushiki Kaisha, Tokyo, Japan

[21] Appl. No.: 340,412

[22] Filed: Nov. 15, 1994

[30] Foreign Application Priority Data

Dec. 10, 1993 [JP] Japan ................................ 5-341336

[51] Int. Cl.$^6$ ........................................ H04N 1/00
[52] U.S. Cl. .................. 358/408; 358/404; 358/401; 358/444; 358/474
[58] Field of Search ........................ 358/401, 408, 358/404, 444, 496, 498, 474

[56] References Cited

U.S. PATENT DOCUMENTS

| | | | |
|---|---|---|---|
| 4,908,719 | 3/1990 | Nonoyama | 358/401 |
| 4,989,238 | 1/1991 | Iggulden et al. | 358/444 |
| 5,038,222 | 8/1991 | Saito | 358/401 |
| 5,126,855 | 6/1992 | Saito | 358/401 |
| 5,280,545 | 1/1994 | Masuda | 382/41 |
| 5,309,557 | 5/1994 | Saitoh et al. | 395/162 |
| 5,365,265 | 11/1994 | Shibata et al. | 348/15 |

*Primary Examiner*—Scott A. Rogers
*Assistant Examiner*—Thomas L. Stoll
*Attorney, Agent, or Firm*—Fitzpatrick, Cella, Harper & Scinto

[57] ABSTRACT

A method and apparatus in which images on the front and back sides of a double-sided original are serially connected on one scanning line, subjected to image processing and converted into binary image data, and immediately separated into the front and back side images again. One of the front and back side images is compressed and transferred to a SCSI bus, and the other is temporarily stored in a graphic video RAM and can be displayed or printed. After the former image is completely compressed and transferred, the latter is read from the video RAM, compressed by the compression circuit and then transferred to the SCSI bus.

14 Claims, 5 Drawing Sheets

IMAGE READING APPARATUS FOR READING BOTH SIDES OF A DOUBLE-SIDED ORIGINAL

BACKGROUND OF THE INVENTION

1. Field of the Invention

The present invention relates to an image reading apparatus for reading images on both sides of a sheet.

2. Description of the Related

When a double-sided original is handled by a conventional image reading apparatus, the following original conveyance/reading mechanisms are used: A mechanism (referred to as "the first example" hereinafter) in which an original is first conveyed for reading an image on the front side, and the original is then turned upside down and again conveyed for reading an image on the back side, and a mechanism (referred to as "the second example" hereinafter) in which a conveyance passage having a length of at least double the length of an original to be read, so that an image on the front side of the original is read in the first half of the conveyance passage, and an image on the back side is then read in the latter half of the conveyance passage.

Another possible double-side reading apparatus is a reading apparatus (referred to as "the third example" hereinafter) of the type in which two image sensors are provided one on each side of a conveyance passage, and one scanning line on the front side of an original is serially connected to one scanning line on the back side for subsequent processing, as disclosed in U.S. Pat. Nos. 5,038,222, 5,126,855 and 5,280,545. This third example has the advantages of simple construction, and high-speed operation.

However, when the image signal processed by the third example is output to the outside, a special format in which image signals of the front and back sides are serially connected on one scanning line is not easily compatible with general processing systems.

In order to use the image signal read by the third example, an image must be read by a batch processing device for reproducing and separating the image stored in a storage medium into images on the front and back sides of an original, again compressing the images if required, and then transmitting the compressed images to a circuit at the next step. Thus, because a large amount of time is required for reading the images, image output to the next step in real time is impossible in reading, and additional memory for temporarily storing image data is required.

SUMMARY OF THE INVENTION

An object of the present invention is to provide an image reading apparatus having none of the above faults.

Another object of the present invention is to provide an image reading apparatus which can easily output an image signal to another apparatus.

A further object of the present invention is to provide an image reading apparatus having a simple construction which can efficiently read images on both sides of a sheet at a high speed.

A still further object of the present invention is to provide an image reading apparatus comprising an inexpensive image processing circuit in a single system in which an image on one side of a sheet is stored in display memory, and at the same time, an image on the other side is compressed and then output through a buffer, and the image stored in the display memory is then compressed and output through the buffer. This apparatus is smaller and cheaper than a conventional apparatus, and is able to efficiently read images on both sides of an original at high speed and output to or store data in a circuit at the next step by using a general format, thereby improving its compatibility with other apparatus.

According to a first aspect of the present invention, an image reading apparatus includes a conveyor for conveying an original sheet, a reading unit for reading images on each of a front and a back side of the original conveyed by the conveyor, a first storage unit for storing the image from one of the front and back sides of the original, each of which has been read by the reading unit, a compression unit for compressing the image from a remaining side of the original, and a second storage unit for temporarily storing the image compressed by the compression unit, wherein the first storage unit and the second storage unit operate concurrently.

According to another aspect of the present invention, an image reading apparatus includes a reading unit for reading images on each of a front and a back side of an original in one line, a connector for serially connecting, in one line, the front and back side images read by the reading unit, a processing unit for performing predetermined processing of the images connected by the connector, a separation unit for separating the images processed by the processing unit into front and back side images, a compression unit for compressing one of the front and back side images separated by the separation unit, a first storage unit for temporarily storing the image compressed by the compression unit, a second storage unit for storing, for display, a remaining image of the front and back side images separated by the separation unit, and a controller for transferring the remaining image stored in the second storage unit to the compression unit for compressing the remaining image after the one image has been compressed by the compression unit.

According to another aspect of the present invention, an image reading method includes the steps of reading images on each of a front and a back side of an original, compressing one of the images from the front and back sides of the original, storing the compressed image in a first storage unit, and storing a remaining image of the front and back side images in a second storage unit concurrently with the compressing and storing of the one of the images of the front and back sides of the original.

According to a further aspect of the present invention, an image reading method includes the steps of reading images on the front and back sides of an original for each line, serially connecting the front and back side read images for each line, performing predetermined processing of the serially connected images, separating the processed images into the front and back side images, compressing a first one of the separated front and back side images, first temporarily storing the compressed image in a first storage unit, storing, for display, a remaining one of the front and back side separated images concurrently with compressing and temporarily storing the first one of the separated front and back side images in a second storage unit, and compressing the image stored in the second storage unit after compressing the first one of the separated front and back side images.

According to yet a further aspect of the present invention, an image reading apparatus includes a reading unit for reading images on each of a front and a back side of an original in one line, a connector for serially connecting, in one line, the front and back side images read by the reading unit, a processing unit for performing predetermined processing of the images connected by the connector, a separation unit for separating the images processed by the processing unit into front and back side images, a cutting-out unit for selecting portions of each of the front and back sides of the original, a first storage unit for storing the cut-out image from one of the front and back sides of the original, a compression unit for compressing the cut-out image from a remaining side of the original, and a second storage unit for temporarily storing the cut-out image compressed by the compression unit, wherein the first storage unit and the second storage unit operate concurrently.

According to yet a further aspect of the present invention, an image reading apparatus includes a reading unit for reading images on each of a front and a back side of an original in one line, a connector for serially connecting, in one line, the front and back side images read by the reading unit, a processing unit for performing predetermined processing of the images connected by the connector, a separation unit for separating the images processed by the processing unit into front and back side images, a first storage unit for storing the image from one of the front and back sides of the original, a first reference clock generating unit for generating a timing signal, a compression unit for compressing image from a remaining side of the original based on a timing signal generated by the first reference clock generating unit, second storage unit for storing a remaining image of the front and back side images separated by the separating unit, a second reference clock generating unit for generating a second timing signal, and a control unit for transferring the remaining image stored in the second storage unit to the compression unit for compressing the remaining image based on the second timing signal generated by the second reference clock generating unit.

Other objects of the present invention will be made clear from the description below with reference to the attached drawings and claims.

DETAILED DESCRIPTION OF THE PREFERRED EMBODIMENTS

Figure 1:
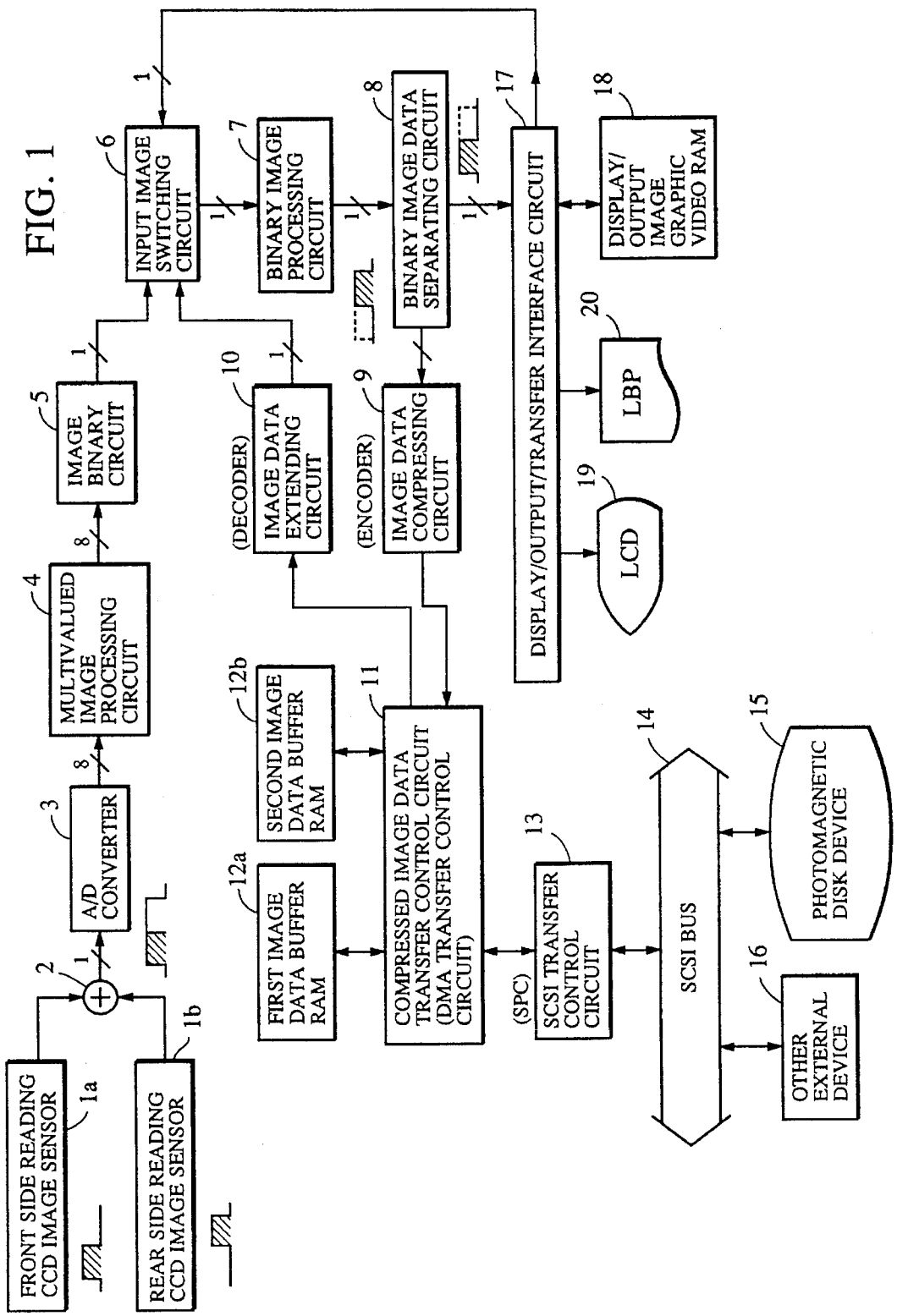
FIG. 1 is a block diagram illustrating a first embodiment of the present invention.

FIG. 1 is a block diagram illustrating the basic configuration of a first embodiment of the present invention.

Image sensors 1a and 1b are CCD image sensors for simultaneously reading images on the front and back sides, respectively, of an original conveyed. A signal synthetic circuit 2 comprises an analog switch for serially connecting analog image data output from the image sensors 1a and 1b to produce a signal. An A/D (analog/digital) converter 3 A/D converts the analog image data output from the signal synthetic circuit 2 to digital multivalued image data.

A multivalued image processing circuit 4 performs image processing of the A/D-converted digital multivalued image signal, which is required for improving image quality. An image binary circuit 5 converts the image signal to a binary signal by using a digital comparator or a pseudo multivalue processing method such as an error diffusion method.

An input image switching circuit 6 selects one of three binary image data lines, and a binary image processing circuit 7 performs image processing of the selected binary image, such as "noise removal", "image frame processing", etc.

A binary image data separating circuit 8 serially connects image signals of the front and back sides by the above circuit on a scanning line, processes the images and then separates the resultant binary image data into the front side signal and back side signal, and an image data compressing circuit 9 encodes the image signal of one of the binary image data separated and compresses the coded image signal.

An image data extending circuit 10 restores the coded image data to the initial binary image data, and buffer RAMs 12a and 12b are a first image data buffer RAM and a second image data buffer RAM, respectively. Each buffer RAM can temporarily store the coded image data for one side.

A transfer control circuit 13 is a circuit for controlling transfer to a SCSI (small computer system interface) bus 14. A photomagnetic disk device 15 and an external device 16 such as a computer, an image file device, or the like are connected to the SCSI bus 14.

A compressed image data transfer control circuit 11 is a DMA transfer control circuit for controlling image data transfer between respective devices. RAM 18 is a display/output image graphic video RAM for temporarily storing image data to be displayed and output, and LCD 19 is a liquid crystal display for displaying an image. LBP 20 is a printer such as a laser beam printer for printing an image on a recording sheet, and an interface circuit 17 is a display/output/transfer interface circuit for controlling transfer of binary image data between the respective devices and transfer to the input image switching circuit 6.

Figure 5:
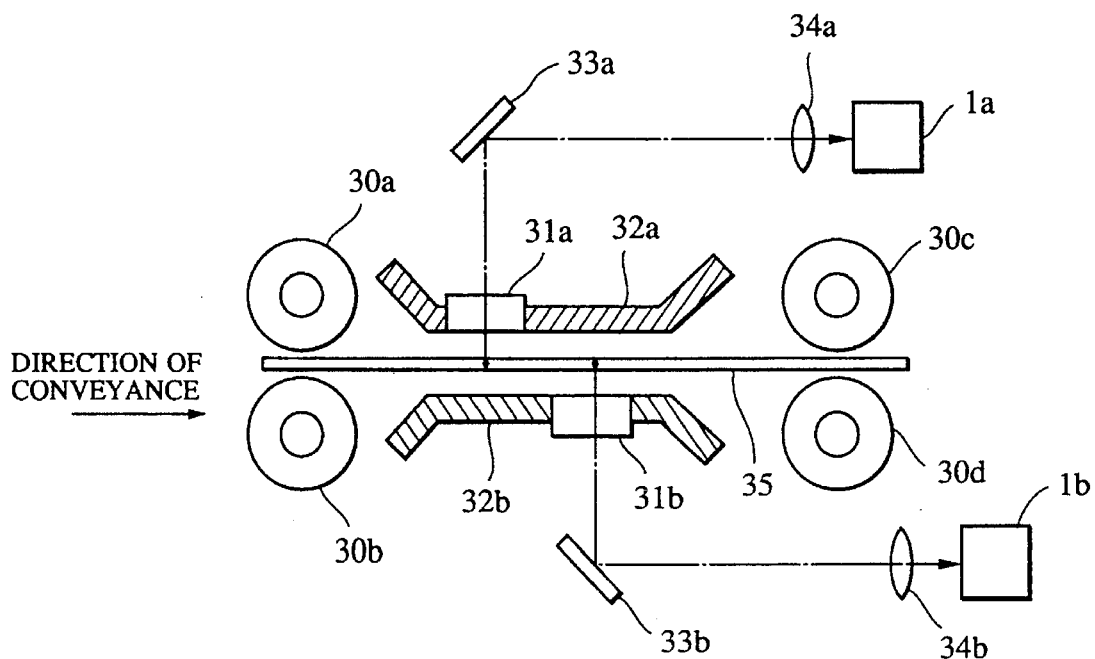
FIG. 5 is a sectional view illustrating an image reading section.

FIG. 5 is a sectional view illustrating the structure of a double-side reading section in accordance with the first embodiment.

As illustrated in FIG. 5, images on both sides of an original 35 conveyed between conveyance guides 32a and 32b by two pairs of conveyance rollers 30a, 30b, 30c and 30d are respectively read by original reading sections provided at substantially opposite positions.

An image (reflected light) on the front side of the original 35 is formed on the front side reading CCD image sensor 1a through an optical path passing through a reading glass 31a, a total reflection plate 33a and an image forming lens 34a. On the other hand, an image (reflected light) on the back side of the original 35 is formed on the back side reading CCD image sensor 1b through an optical path passing through a reading glass 31b, a total reflection plate 33b and an image forming lens 34b.

The operation of the apparatus of this embodiment is described in detail with reference to FIG. 1.

The output timing of the analog image data read by the two CCD image sensors 1a and 1b is controlled by a CCD transfer driving circuit (not shown) so that the data from the front side reading CCD image sensor 1a is in the first half on a scanning line, and the data from the back side reading CCD image sensor 1b is in the latter half on the line.

Figure 6:
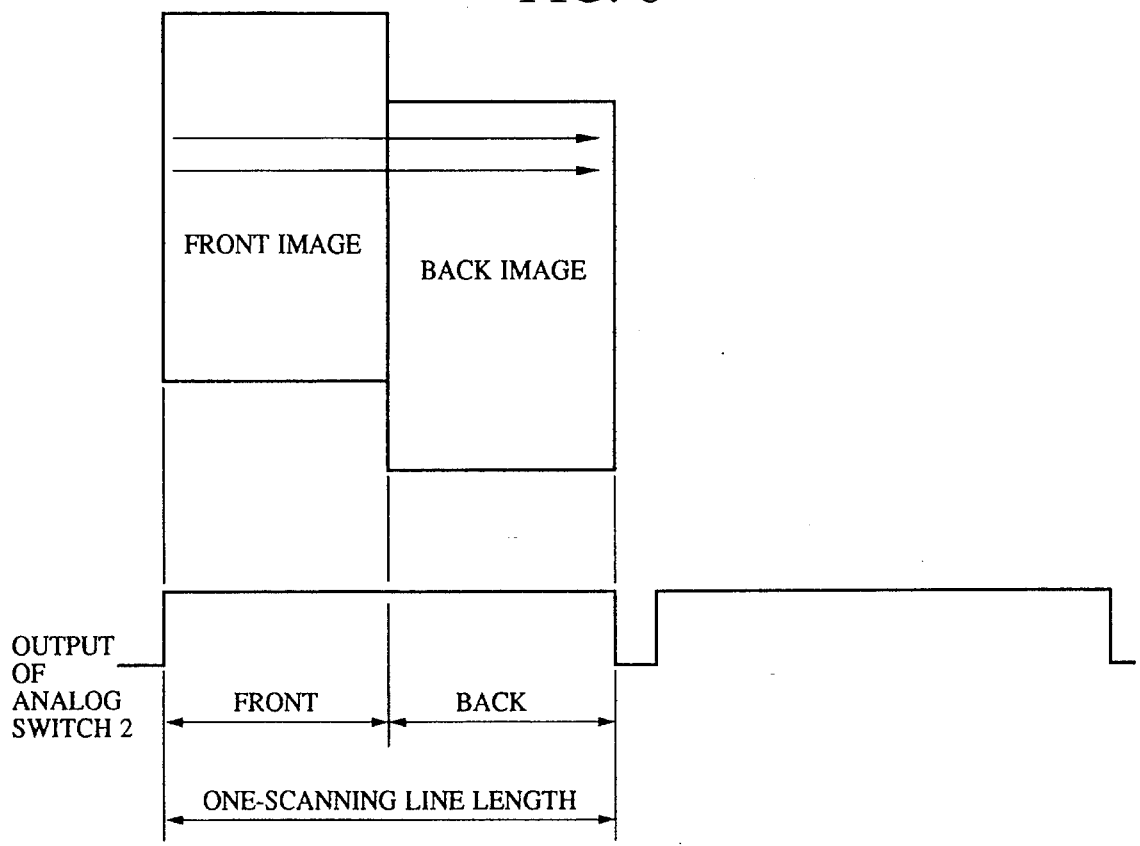
FIG. 6 is a drawing illustrating a state where an image is read.

The analog image data output from the two CCD image sensors 1a and 1b are combined by the analog switch 2, as shown in FIG. 6, to form a signal on one scanning line comprising front side image data in the first half, and back side image data in the latter half.

The thus-formed signal is then converted into 8-bit digital image data by the A/D converter 3, subjected to image processing such as "shading correction", "γ-correction" and "edge enhancement" for improving image quality by the multivalued image processing circuit 4, and then changed to a white-black level binary image signal by the image binary circuit 5. When the original is read, the binary image data is then input to the binary image processing circuit 7 through the input switching circuit 6 which is switched to the side of the image binary circuit 5, and subjected to image processing such as "noise removal", "image frame processing" and so on.

The binary image data is then separated again into front side image data and back side image data by the binary image data separating circuit 8. The front side image data is transmitted to the display/output/transfer interface circuit 17, temporarily stored in the display/output image graphic video RAM 18 under control by the circuit 17, and then sent as display data to the LCD 19 to display the read original image on a monitor.

The back side image data is transmitted to the image data compressing circuit 9 to be encoded, and then stored in the first image data buffer RAM 12a under control by the compressed image data transfer control circuit 11.

When the original is completely read, and when the compressed image data for one side of the original is completely stored in the first image data buffer RAM 12a, the compressed image data of the one side is then read under control by the compressed image data transfer control circuit 11. The read image data is transferred to the SCSI transfer control circuit 13, output to the SCSI bus 14 under control by the SCSI transfer control circuit 13, and stored in a storage medium in the photomagnetic disk device 15 connected to the SCSI bus 14 or output to the external device 15 connected thereto.

At the same time, the front side image data which is temporarily stored in the display/output image graphic video RAM 18 is read by the display/output/transfer interface circuit 17, compressed according to the same procedure as that described above through the input image switching circuit 6, and then temporarily stored in the second image data buffer RA 12b.

When the all data in the first image data buffer RAM 12a is completely output, the data in the second image data buffer RAM 12b is output onto the SCSI bus 14 according to the same procedure as that described above.

Since the images on both side of the original are completely read and transferred by the above-described processing, a plurality of originals can be processed by repeatedly executing the above-described series of operations.

The processing of the front side image and the processing of the rear side image may be reversed.

Figure 2:
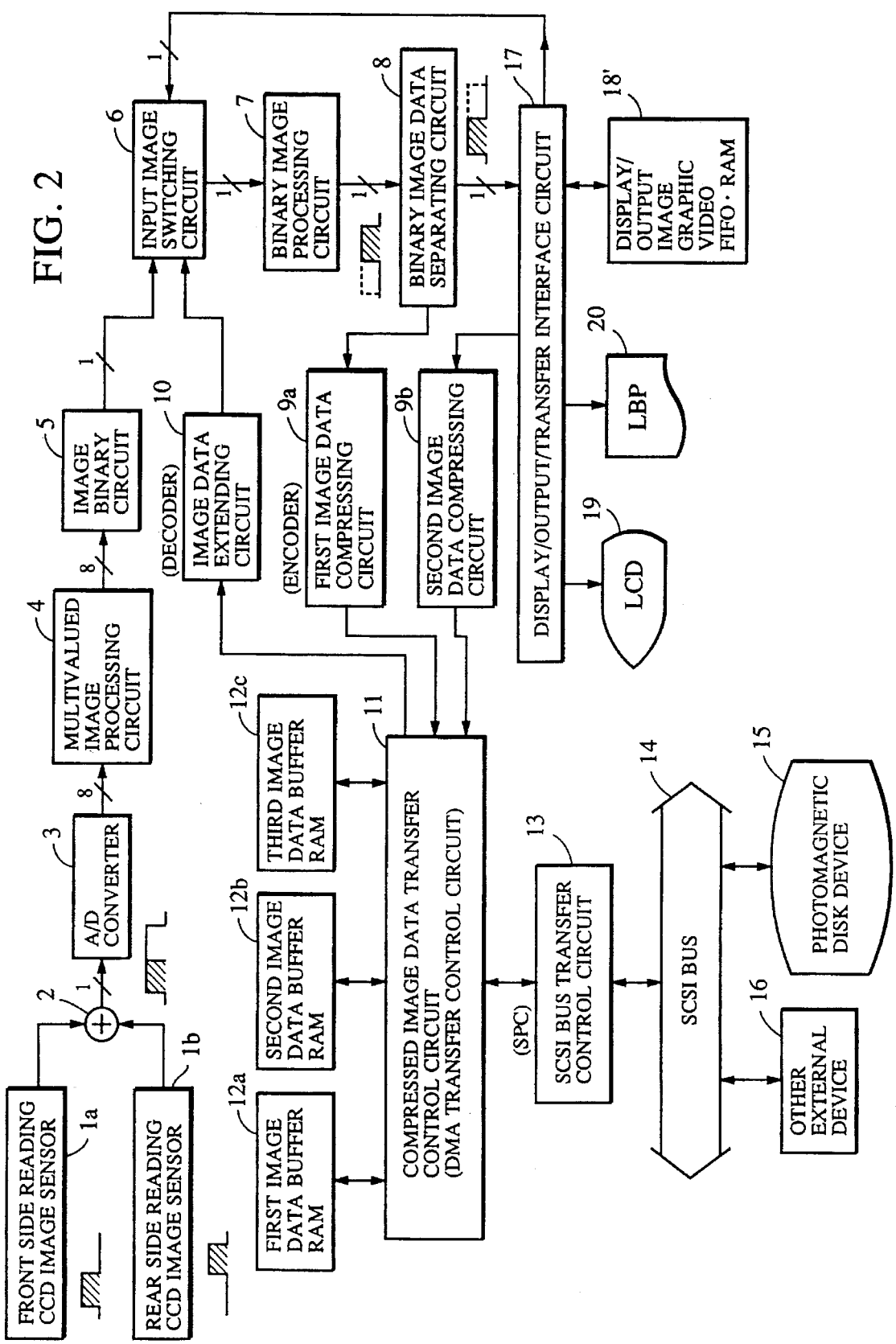
FIG. 2 is a block diagram illustrating a second embodiment of the present invention.

FIG. 2 is a block diagram illustrating the basic configuration of a second embodiment of the present invention. Structures corresponding to those of the first embodiment are identically numbered.

As illustrated in FIG. 2, an apparatus of this embodiment comprises first and second image data compressing circuits 9a and 9b which are provided in place of the image data compressing circuit 9, a third image data buffer RAM 12c which is added to the buffer RAM 12a and 12b, and a display/output image graphic video FIFO-RAM 18' provided in place of the display/output image graphic video RAM 18.

The display/output image graphic video FIFO-RAM 18' has a FIFO (first-in first-out) structure having two input/output ports so that next image data can be stored by an operation in parallel to the operation of outputting the stored image data. The other components are the same as in the first embodiment.

In the first embodiment, after a first original is completely read, reading of a next original cannot be started until the image data of the other side of the first original in the display/output image graphic RAM 18 is compressed, and temporarily stored in the second image data buffer RAM 12b, and the compressed image data on the SCSI bus 14 is completely transferred. The speed of reading originals is thus limited.

In the second embodiment, addition of the above components permits transfer of compressed image data of one side of a next original using the second image compressing circuit 9b and the third image buffer RAM 12c in parallel to the operation of storing data in the second image data buffer RAM 12b. The display/output image graphic video FIFO-RAM 18' having a two-port FIFO structure permits the start of reading and storage of image data on one side of the present original while outputting image data of one side of the previous original, and thus permits continuous supply and conveyance of the originals, without waiting the conveyance of the originals, thereby realizing high-speed reading.

Figure 3:
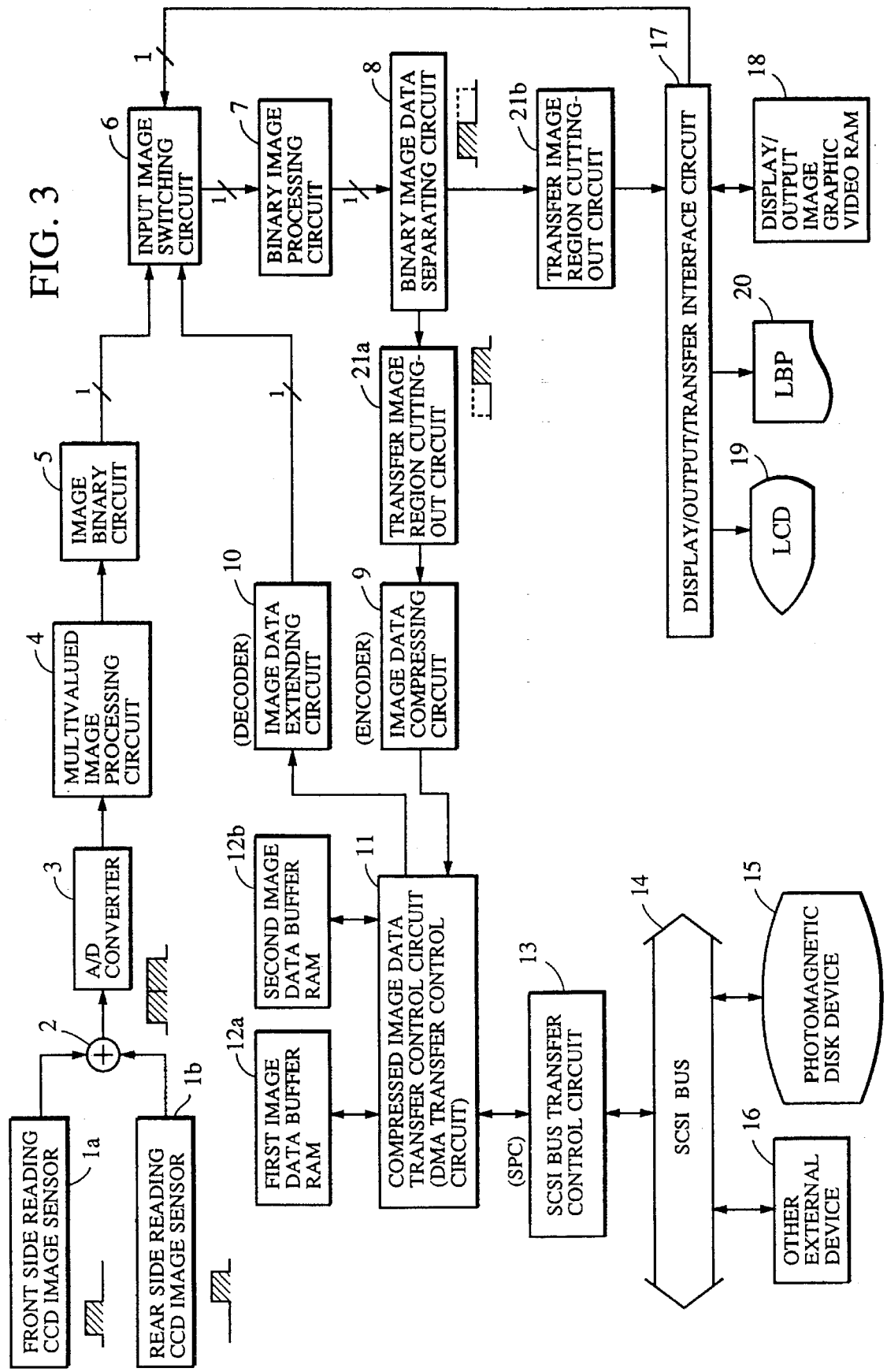
FIG. 3 is a block diagram illustrating a third embodiment of the present invention.

FIG. 3 is a block diagram illustrating the basic configuration of a third embodiment of the present invention. Structures corresponding to those of the first embodiment are identically numbered.

In this drawing, transfer image region cutting-out circuits 21a and 21b are respectively provided on output lines from the binary image data separating circuit 8 and receive the separated front and back side binary image data separated again so as to cut out a transfer image region. The other components are the same as in the first embodiment.

This embodiment is useful when only a portion of an original is to be recorded because it enables an operator to cut out any selected portion of each of the front and back sides of the original which are then transferred to the next step.

The above function is very useful when a thin double-sided original must be placed on a background for preventing printing an image on the back side of the original which can be seen through the thin original, or when selecting a frame of thee original for printing or storage.

When this system is employed for a double-sided original, since a black background must be prepared for each of the sides, the physical reading positions on the front side and back side must be staggered, as shown in FIG. 5. As a result, the read image data of the front and back sides are combined in one scanning line in a state where the image data is offset, as shown in FIG. 6. Even if the data of the front and back sides are separated, compressed, and then output onto the SCSI bus, the offset remains, and, if required, the offset must thus be corrected on the side of receiving the compressed image data.

In this embodiment, since the offset is corrected by using the image cutting-out circuits 21a and 21b, respectively provided for the front and back sides, immediately after the image data of both sides are connected on one-scanning line, and then subjected to image processing and converted into binary image data and then separated again into front and back side image data, high-speed reading can be realized using a simple circuit at low cost.

Although this embodiment relates to the example where the transfer image region cutting-out circuit 21b is provided on the signal input side of the image display/output section, this circuit can be provided on the signal output side or both sides according to demand.

Figure 4:
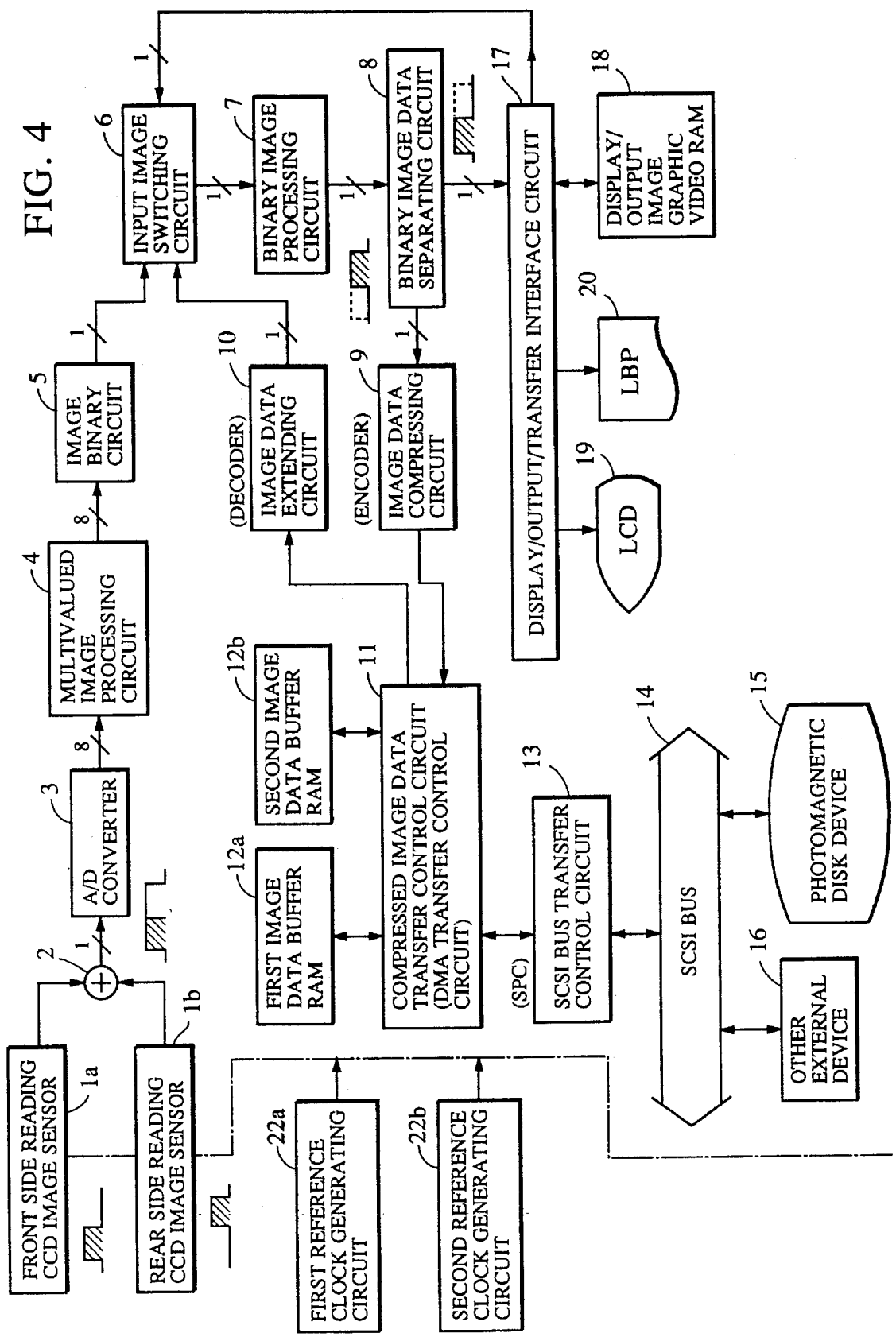
FIG. 4 is a block diagram illustrating a fourth embodiment of the present invention.

FIG. 4 is a block diagram illustrating the basic configuration of a fourth embodiment of the present invention.

In FIG. 4, first and second reference clock generating circuits 22a and 22b are circuits for supplying a reference clock to each of the circuits of the apparatus. The other components are the same as in the first embodiment.

In this embodiment, the first reference clock generating circuit 22a is used in the first operation mode in which an image on any desired side of a double-sided original is compressed, and temporarily stored in the compressed image buffer RAM 12a, and, at the same time, an image on the other side is stored as a monitor image as it was in the graphic video RAM 18. The second reference clock generating circuit 22b is used in the second operation mode in which, after the first operation mode, the image data is read from the graphic video RAM 18, transferred to the image data compressing circuit 9, compressed and then temporarily stored in the second image data buffer RAM 12b. Since an optimum operation frequency is set for each of the operations, the operating speed can be further increased.

Namely, in the first operation mode including the operation of reading image data on an original by the CCD image sensors 1a and 1b, the limit of the operation frequency of the CCD image sensors 1a and 1b is 8 to 12 MHz under the present conditions. On the other hand, the second operation mode including only the operations of the internal circuits of the apparatus can be executed at the operation frequency of 16 to 23 MHz. When the above two operation modes are executed by using a single reference clock, the second operation mode can be executed only at a frequency of 8 to 12 MHz, thereby limiting the operation speed. In this embodiment, since the two reference clock generating circuits 22a and 22b are switched in accordance with the operation modes, as described above, the above problem can be solved.

The present invention is not limited to the above embodiments, and various modifications can be made within the scope of the claims.

What is claimed is:

1. An image reading apparatus comprising:
   conveyance means for conveying an original sheet;
   reading means for reading concurrently an image of a front side and an image of a back side of the original conveyed by said conveyance means;
   compression means for compressing one of the images of the front side and of the back side of the original, each of which has been read by said reading means;
   first storage means for storing the other image concurrently with compression of said one image by said compression means; and
   second storage means for temporarily storing said one image compressed by said compression means,
   wherein, after said one image is compressed and stored in said second storage means, said compression means compresses said other image which is stored in said first storage means.

2. An apparatus according to claim 1, further comprising:
   control means for reading the other image stored in said first storage means and transferring the read image to said compression means after the one image has been compressed by said compression means.

3. An apparatus according to claim 1, further comprising:
   display means for displaying the original images read by said reading means, said first storage means also serving as display memory for said display means.

4. An image reading apparatus comprising:
   reading means for reading concurrently an image of a front side and an image of a back side of an original in one line;
   connection means for serially connecting, in one line, the image of the front side and the image of the back side read by said reading means;
   processing means for performing predetermined processing of the images connected by said connection means;
   separation means for separating the images processed by said processing means into the image of the front side and the image of the back side;
   compression means for compressing one of the image of the front side and the image of the back side separated by said separation means;
   first storage means for temporarily storing the one image compressed by said compression means;
   second storage means for storing, for display, the other image concurrently with compression of said one image by said compression means; and
   control means for transferring the other image stored in said second storage means to said compression means for compressing the other image after the one image has been compressed by said compression means.

5. An apparatus according to claim 4, further comprising:
   third storage means for temporarily storing the other image after transfer by said control means and compression by said compression means.

6. An apparatus according to claim 5, further comprising:
   output control means for controlling output, of the images stored in said first and third storage means.

7. An image reading method comprising the steps of:
   reading concurrently an image of a front side and an image of a back side of an original;
   compressing one of the image of the front side and the image of the back side of the original;
   storing the compressed image in first storage means;
   storing the other image in second storage means concurrently with said compressing and storing of the one image; and
   compressing, after compressing and storing said one image, the other image stored in said second storage means.

8. A reading method according to claim 7, further comprising the steps of:
   storing the other image compressed in third storage means; and
   outputting the images stored in the first storage means and the third storage means.

9. A reading method according to claim 8, wherein the images are output to an image file device.

10. An image reading method comprising the steps of:
    reading concurrently an image of a front side and an image of a back side of an original for each line;
    serially connecting the image of the front side and the image of the backside read for each line;
    performing predetermined processing of the serially connected images;
    separating the processed images processed into the image of the front side and the image of the back side;

compressing one of the image of the front side and the image of the back side separated;

temporarily storing the compressed image in a first storage means storing, for display, the other separated image concurrently with compressing and temporarily storing the one image in a second storage means;

compressing the other image stored in the second storage means after compressing the one image.

11. A reading method according to claim 10, further comprising the steps of:

temporarily storing the other image compressed in third storage means; and outputting the image temporarily stored in the first storage means and the image temporarily stored in the third storage means.

12. A reading method according to claim 11, wherein the image is output to an image file device.

13. An image reading apparatus comprising:

reading means for reading concurrently an image of a front side and an image of a back side of an original in one line;

connection means for serially connecting, in one line, the front and back side images read by said reading means;

processing means for performing predetermined processing of the images connected by said connection means;

separation means for separating the images processed by said processing means into front and back side images;

cutting-out means for selecting portions of each of the front and back sides of the original;

first storage means for storing the cut-out image from one of the front and back sides of the original;

compression means for compressing the cut-out image from a remaining side of the original; and second storage means for temporarily storing the cut-out image compressed by said compression means, wherein said first storage means and said second storage means operate concurrently.

14. An image reading apparatus comprising:

reading means for reading concurrently an image of a front side and an image of a back side of an original in one line;

connection means for serially connecting, in one line, the front and back side images read by said reading means;

processing means for performing predetermined processing of the images connected by said connection means;

separation means for separating the images processed by said processing means into front and back side images;

first storage means for storing the image from one of the front and back sides of the original;

first reference clock generating means for generating a timing signal;

compression means for compressing the image from a remaining side of the original based on a timing signal generated by said first reference clock generating means;

second storage means for storing the remaining image of the front and back side images separated by said separation means;

second reference clock generating means for generating a second timing signal; and control means for transferring the remaining image stored in said second storage means to said compression means for compressing the remaining image based on the second timing signal generated by said second reference clock generating means.

* * * * *

UNITED STATES PATENT AND TRADEMARK OFFICE
CERTIFICATE OF CORRECTION

PATENT NO. : 5,619,343
DATED : April 8, 1997
INVENTOR(S) : MASAMI AMEMIYA

It is certified that error appears in the above-identified patent and that said Letters Patent is hereby corrected as shown below:

COLUMN 1:

Line 10, "Related" should read --Related Art--.

COLUMN 3:

Line 23, "second" should read --a second--.

COLUMN 4:

Line 34, "output/transferinterface" should read --output/transfer interface--.

UNITED STATES PATENT AND TRADEMARK OFFICE
CERTIFICATE OF CORRECTION

PATENT NO. : 5,619,343
DATED : April 8, 1997
INVENTOR(S) : MASAMI AMEMIYA

It is certified that error appears in the above-identified patent and that said Letters Patent is hereby corrected as shown below:

COLUMN 5:

Line 3, "$\gamma$-correction"" should read --"$\gamma$-correction"--.
   Line 43, "the all" should read --all the--.
   Line 47, "side" should read --sides--.

COLUMN 6:

Line 45, "thee" should read --the--.

Signed and Sealed this

Thirtieth Day of September, 1997

Attest:

BRUCE LEHMAN

Attesting Officer   Commissioner of Patents and Trademarks